G. A. COLLISON.
AUTOMOBILE TIRE PUMP.
APPLICATION FILED MAR. 10, 1911.
1,009,382.
Patented Nov. 21, 1911.
2 SHEETS—SHEET 1.
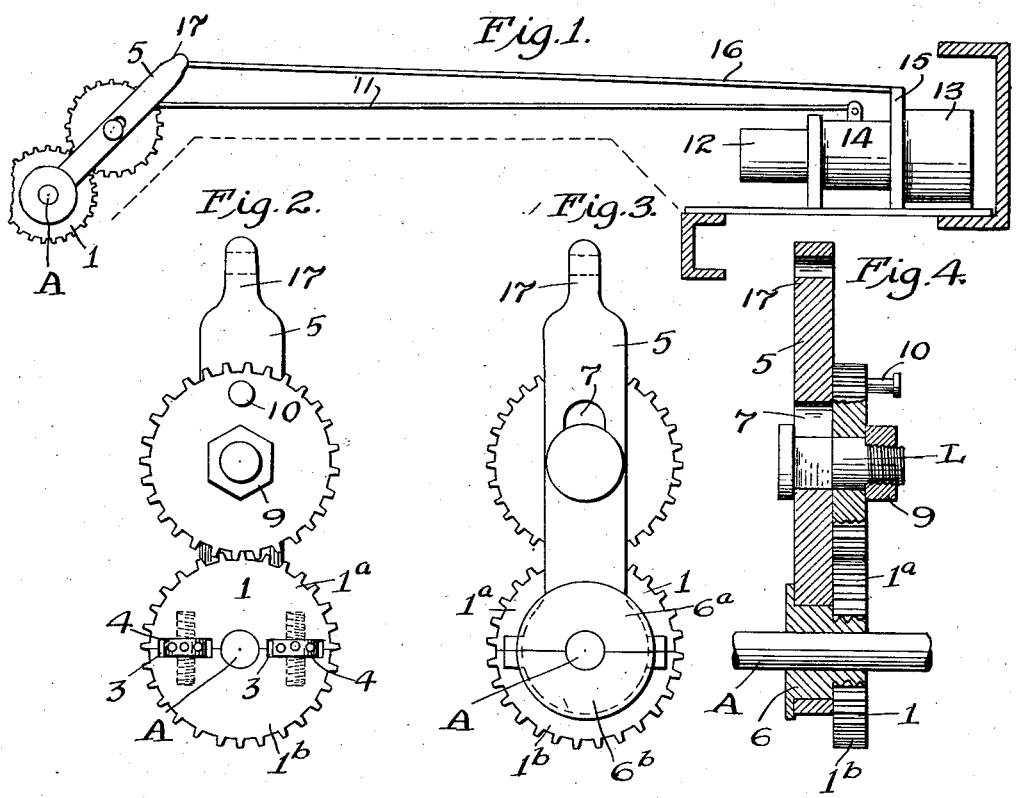
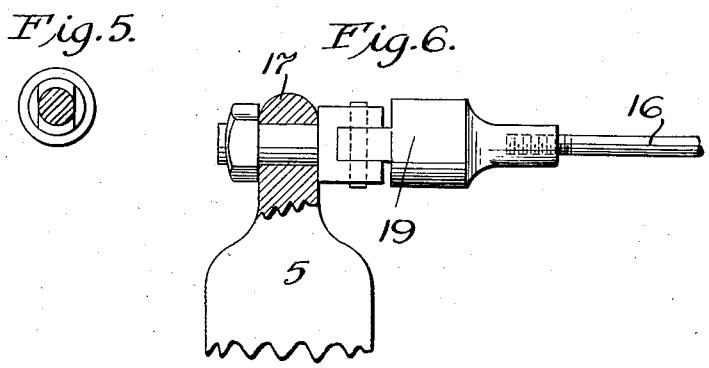
WITNESSES
INVENTOR
George A. Collison
BY
ATTORNEY
COLUMBIA PLANOGRAPH CO., WASHINGTON, D. C.

G. A. COLLISON.
AUTOMOBILE TIRE PUMP.
APPLICATION FILED MAR. 10, 1911.
1,009,382.
Patented Nov. 21, 1911.
2 SHEETS—SHEET 2.
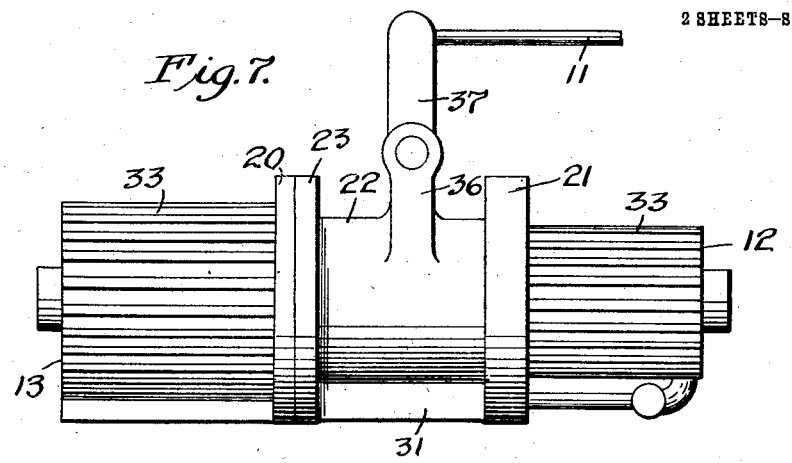
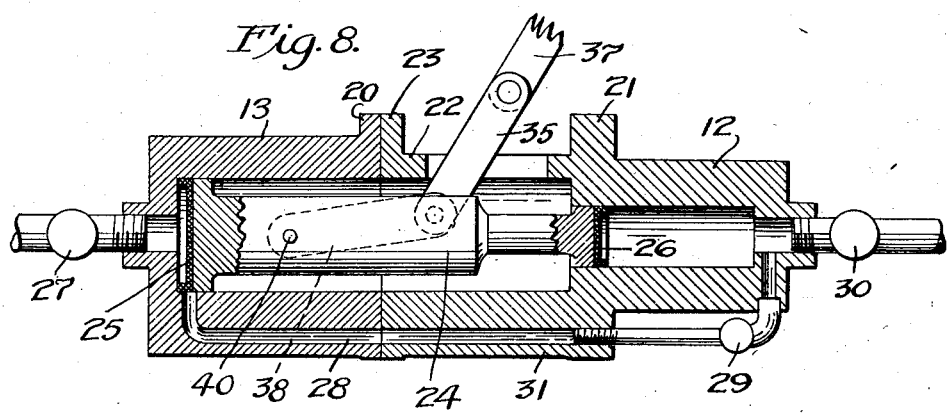
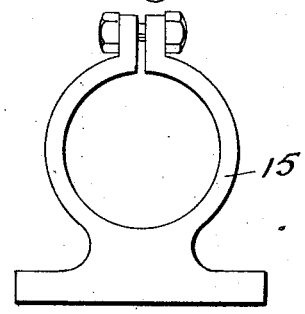
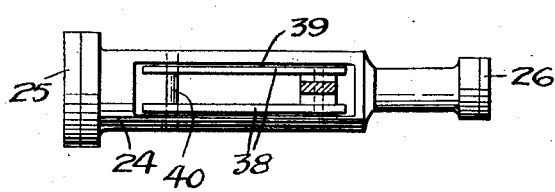
WITNESSES
INVENTOR
George A. Collison
BY
ATTORNEY

UNITED STATES PATENT OFFICE.

GEORGE A. COLLISON, OF BURLINGTON, VERMONT.

AUTOMOBILE TIRE-PUMP.

1,009,382.   Specification of Letters Patent.   Patented Nov. 21, 1911.

Application filed March 10, 1911.  Serial No. 613,563.

*To all whom it may concern:*

Be it known that I, GEORGE A. COLLISON, a citizen of the United States, residing at Burlington, in the county of Chittenden and State of Vermont, have invented a new and useful Improvement in Automobile Tire-Pumps, of which the following is a specification.

This invention relates to automobile tire pumps, to the construction of the pump, and to a means for driving such a pump by connections extending from the usual magneto shaft, or usual circulation pump shaft, or some other shaft or rotating part which may be accessible in the car.

One of the objects of the invention is to take up the to and fro thrust or reaction due to the working of the pump independent of any strain or wear on the magneto shaft or other similar shaft from which the pump is driven.

In addition to this, it is an object of the invention to provide for transmitting the power in an angular rather than a straight path, and further in a path of narrow width or compass and of any required length, thus accommodating the construction to a wide variety of locations in different cars.

Other objects are to have all the strains selfcontained in the mechanism, and to avoid parts which are difficult of attachment; also to minimize wear and lubrication difficulties, and generally provide a device for the purpose set forth which is compact and durable, and as integral a part of the car mechanism to which it is attached, as any other features which may be permanently built therein.

Other objects will appear from the following detailed description.

The invention consists in the improved attachment for automobiles as hereinafter set forth.

In the drawings showing the embodiment of the invention, Figure 1, is a side elevation showing a pump and driving means attached to an automobile and embodying the principles of my invention; Fig. 2, is a detail front view showing part of the driving means of Fig. 1; Fig. 3, is a similar view from the opposite side; Fig. 4, is a vertical sectional view of the construction of Figs. 2 and 3; Fig. 5, is an end view partly in section of the supporting stud or axle for one of the gears; Fig. 6, illustrates a form of brace rod having universal joint connection whereby it may be extended in any direction; Fig. 7, is a side elevation of a pump embodying the principles of the invention; Fig. 8, is a vertical sectional view of the same; Fig. 9, is a top view of the piston plunger and part of its driving means, and Fig. 10, is a detail side view of one of the straps for holding the pump in place.

Constructions embodying the invention will include a gear on a shaft such as A which is driven by the engine, and also a gear in mesh or driven from the first and having a crank or eccentric from which extends the pitman for the pump cylinder or cylinders. As an example of a gear adapted to be received on the driving shaft, I have illustrated a split gear 1 comprising two halves 1ª and 1ᵇ respectively. The gear 1 may be variously constructed so as to fit securely on the desired driving shaft A and in the approved construction shown the two halves are recessed as shown at 3 and are clamped together by right and left handed screws 4, the screws having a suitable enlarged portion with socket holes to permit their being tightened in place.

The second gear above mentioned is put in mesh with the first while the pump is working, and is designed to be equally in mesh whatever position it may have around the driving shaft. As the best construction for accomplishing this purpose and the various other purposes referred to in the preliminary part of the specification, there is provided an arm 5 journaled on a hub 6 attached to or forming part of the gear 1. To correspond to a split gear 1, the hub is correspondingly split into two halves 6ª and 6ᵇ respectively fixed to or part of the gear halves. 7 denotes a slot at the outer end of the arm 5 and in this slot may be clamped the hub or axle L of the gear 2 so as to make said gear radially adjustable in the slot. The hub or axle may be tightened in its inner or outer position by a nut 9.

The pitman for the pump cylinder or cylinders may be quite long in accordance with the present invention and is adapted to extend in any direction from the gear 2. The combined arrangement permits the power to be transmitted to an angular path, the angle of which may be acute or obtuse and in any degree depending on the angular position of the arm 5 and the direction that the pitman extends from the gear 2. In this way the attachment is adapted to a wide variety of different cars. In the best constructions the gear 2 will merely have a crank or wrist pin 10 from which the pitman 11 directly extends.

A compound pump is illustrated having a high pressure cylinder 12 and a low pressure cylinder 13 with two pistons or plungers connected by yoke or body 14. The pitman extends from the body 14 by a suitable or desired connection. An approved form of which is later described.

15 denotes a strap or clamp for securing the pump cylinders to the frame of the car.

In the approved construction a brace-rod 16 will be provided, and will extend from an ear 17 on the arm 5 to any convenient fixed point, and the direction of this brace-rod should be generally in line with the forces put on the pitman in the working of the pump. By joining the brace-rod to the arm 5 at one end and to the pump cylinders at the other, the strain or forces are made substantially self-contained within the mechanism so that undue strain and wear will not be put on the magneto shaft nor will looseness and wear develop from the working. I prefer a universal joint connection such as 19 (Fig. 6) at both ends of the brace-rod 16. It is evident that a larger number of gears than the number shown may be employed on the arm 5 if desired, and further that the power is transmitted in effect around a corner which may have any angle or length of sides.

The invention contemplates the provision of a pump having high and low pressure cylinders, and the best constructions will include a low pressure cylinder 13 with a flange 20, a high pressure cylinder 12 with a flange 21, and an extended body 22 having a flange 23 adapted to be coupled to the flange 20.

24 denotes a compound piston or plunger having cup-washers 25 and 26 for the bores of the respective cylinders.

27 denotes an inlet check valve, 28 a passage, 29 a second check valve, and 30 an outlet check valve or passage. It is evident that the reciprocation of the plunger 24 results in a two stage compression of the air by principles which will be familiar to those skilled in the art.

The practical features of the pump present distinction in the characteristics thus far described and further in the characteristic of making a portion of the passage 28 in a rib 31 on the body 22.

32 is a pipe which completes the passage 28 past the high pressure cylinder. Suitable ribs 33 on the cylinders facilitate radiation. The best constructions embodying the invention will further include a crank 35 pivoted on a standard 36 of the body 22 and having an arm 37 to which the pitman 11 is pivoted.

38 is a link or links located in a slot 39 of the plunger 24 and joining a pin 40 of said plunger to the lower end of the crank 35.

While I have described a form or embodiment of the invention which is for ordinary purposes the most approved construction, I do not desire to be limited or restricted thereto since variations may be made without departing from the principles of service, and spirit, and scope of the invention.

What I claim is:—

1. In a pump attachment for automobiles, the combination of a gear adapted to be fixed to a driving shaft, an arm pivoted co-axial with said gear, a second gear journaled on said arm, a pump cylinder, and a pitman connection from said second gear to the pump cylinder.

2. In a pump attachment for automobiles, the combination of a gear having a hub, a slotted arm journaled on said hub, a gear having an axle adjustable in said slot, a pump cylinder adapted to be attached to the car at any convenient point and a pitman extending from the pump cylinder to said second gear.

3. In a pump attachment for automobiles, the combination of a gear having a hub, a slotted arm journaled on said hub, a second gear having an axle adjustable on said slotted arm, a pump cylinder adapted to be attached to the car at any convenient point, and a brace-rod extending from said arm.

4. In a pump attachment for automobiles, the combination of a gear having a hub, a slotted arm journaled on said hub, a second gear having an axle adjustable on said slotted arm, a pump cylinder adapted to be attached to the car at any convenient point, and a brace-rod having a universal joint connection with said arm.

5. In a pump attachment for automobiles, the combination of a gear having a hub, a slotted arm journaled on said hub, a second gear having an axle adjustable on said slotted arm, a pump cylinder adapted to be attached to the car at any convenient point, and a brace-rod having a universal joint connection at each end and extending from said arm.

6. In a pump attachment for automobiles, the combination of co-axial high and low pressure pump cylinders a plunger having cup-washers at each end, a crank joined to said plunger and extending out laterally between the pump cylinders, and connections for rocking said crank on its axis.

7. In a pump attachment for automobiles, the combination of co-axial high and low pressure pump cylinders, a plunger having piston portions at each end and slotted intermediate said piston portions, a crank having a link connection with said plunger, said link connection being located in the slot thereof, and means for rocking said crank on its axis.

8. In a pump attachment for automobiles, the combination of co-axial high and low pressure cylinders, a plunger having cup-washers at each end, check valves 27 and 30, a passage 28, 32 and a check valve 29, said passage being partially formed in a rib on the cylinders, substantially as described.

9. In a pump attachment for automobiles, a low pressure cylinder having a flange, a high pressure cylinder having two flanges and an intermediate body, means for connecting the cylinder, and straps surrounding said flanges.

In testimony whereof, I have signed my name to this specification in the presence of two subscribing witnesses, this 17th day of February, 1911.

GEORGE A. COLLISON.

Witnesses:
CLAUDE D. GRATON,
W. W. WHEELER.

Copies of this patent may be obtained for five cents each, by addressing the "Commissioner of Patents, Washington, D. C."